(12) United States Patent
Juranitch

(10) Patent No.: US 11,718,547 B2
(45) Date of Patent: Aug. 8, 2023

(54) DIRTY WATER TREATMENT OPTIMIZATION

(71) Applicant: XDI HOLDINGS, LLC, Bedford, NH (US)

(72) Inventor: James Charles Juranitch, Fort Lauderdale, FL (US)

(73) Assignee: XDI Holdings, LLC, Bedford, NH (US)

( * ) Notice: Subject to any disclaimer, the term of this patent is extended or adjusted under 35 U.S.C. 154(b) by 29 days.

(21) Appl. No.: 16/981,680

(22) PCT Filed: Mar. 18, 2019

(86) PCT No.: PCT/US2019/022704
§ 371 (c)(1),
(2) Date: Sep. 16, 2020

(87) PCT Pub. No.: WO2019/178589
PCT Pub. Date: Sep. 19, 2019

(65) Prior Publication Data
US 2021/0032144 A1    Feb. 4, 2021

Related U.S. Application Data

(60) Provisional application No. 62/693,749, filed on Jul. 3, 2018, provisional application No. 62/644,198, filed on Mar. 16, 2018.

(51) Int. Cl.
*C02F 9/00*         (2023.01)
*B01D 61/02*        (2006.01)
(Continued)

(52) U.S. Cl.
CPC .............. *C02F 9/00* (2013.01); *B01D 61/025* (2013.01); *B01D 61/04* (2013.01); *C02F 1/20* (2013.01);
(Continued)

(58) Field of Classification Search
CPC .. C02F 9/00; C02F 1/004; C02F 1/041; C02F 1/048; C02F 1/24; C02F 1/441; C02F 2101/32; C02F 2103/10; C02F 2303/04; C02F 1/02; C02F 1/04; C02F 1/16; C02F 1/44; C02F 1/52; C02F 1/5263; C02F 1/5281; C02F 1/20; B01D 1/00; B01D 1/0011; B01D 1/0041; B01D 1/0047; B01D 1/28; B01D 3/00; B01D 3/0065; B01D 3/146; B01D 21/0027; B01D 21/0084;
(Continued)

(56) References Cited

U.S. PATENT DOCUMENTS

| 7,264,419 B2 | 9/2007 | Bowman et al. |
| 8,016,041 B2 | 9/2011 | Kerfoot |

(Continued)

FOREIGN PATENT DOCUMENTS

WO    2018/152463 A1    8/2018

*Primary Examiner* — Joseph W Drodge
(74) *Attorney, Agent, or Firm* — Dykema Gossett PLLC

(57) ABSTRACT

Embodiments of the present disclosure include a system for optimizing dirty water remediation and re-use. The system can include a first treatment system that includes a direct contact thermal distillation system or an evaporator. The system can further include a frac water re-use treatment system.

9 Claims, 2 Drawing Sheets

(51) Int. Cl.
- *B01D 61/04* (2006.01)
- *E21B 43/34* (2006.01)
- *C02F 1/04* (2023.01)
- *C02F 1/24* (2023.01)
- *C02F 1/44* (2023.01)
- *E21B 43/26* (2006.01)
- *C02F 1/20* (2023.01)
- *C02F 1/00* (2023.01)
- *C02F 101/32* (2006.01)
- *C02F 103/10* (2006.01)

(52) U.S. Cl.
CPC .......... *E21B 43/34* (2013.01); *B01D 2311/04* (2013.01); *B01D 2311/103* (2013.01); *B01D 2311/2669* (2013.01); *C02F 1/004* (2013.01); *C02F 1/041* (2013.01); *C02F 1/048* (2013.01); *C02F 1/24* (2013.01); *C02F 1/441* (2013.01); *C02F 2101/32* (2013.01); *C02F 2103/10* (2013.01); *C02F 2303/04* (2013.01); *E21B 43/2607* (2020.05)

(58) Field of Classification Search
CPC ...... B01D 21/16; B01D 36/00; B01D 61/025; B01D 61/04; B01D 2311/04; B01D 2311/103; B01D 2311/2669; B01D 2311/2642; B01D 2311/2673; B01D 2311/2692; E21B 43/34; E21B 43/26; E21B 43/40
See application file for complete search history.

(56) References Cited

U.S. PATENT DOCUMENTS

| | | | |
|---|---|---|---|
| 8,834,726 B2 | 9/2014 | Keister | |
| 9,751,777 B1* | 9/2017 | Bader | C02F 1/40 |
| 10,322,952 B1* | 6/2019 | Bader | C02F 1/447 |
| 2007/0102359 A1* | 5/2007 | Lombardi | B01D 61/16 |
| | | | 210/764 |
| 2011/0253634 A1* | 10/2011 | Soane | C02F 1/28 |
| | | | 210/488 |
| 2011/0290725 A1* | 12/2011 | Al-Arifi | B01D 61/364 |
| | | | 210/640 |
| 2012/0024525 A1 | 2/2012 | Svarczkopf et al. | |
| 2012/0168157 A1 | 7/2012 | DiTommaso et al. | |
| 2013/0075335 A1* | 3/2013 | Prakash | B01D 61/002 |
| | | | 210/640 |
| 2014/0353252 A1 | 12/2014 | Hester et al. | |
| 2015/0122631 A1* | 5/2015 | James | B01D 1/0082 |
| | | | 203/1 |
| 2016/0002073 A1* | 1/2016 | Nowosielski-Slepowron | B01D 61/58 |
| | | | 202/176 |
| 2016/0003073 A1* | 1/2016 | Derclaye | F01D 9/041 |
| | | | 415/200 |
| 2016/0031731 A1* | 2/2016 | Holland | B03C 1/02 |
| | | | 210/695 |
| 2016/0206658 A1* | 7/2016 | Knol | A61K 31/715 |
| 2016/0362309 A1* | 12/2016 | Kiahghadi | C02F 1/441 |
| 2018/0345167 A1* | 12/2018 | Zhu | B01D 5/0003 |

\* cited by examiner

DIRTY WATER TREATMENT OPTIMIZATION

CROSS-REFERENCE TO RELATED APPLICATIONS

This application is a national stage application of International application no. PCT/US2019/022704, filed 18 Mar. 2019 (the '704 application) and published under International publication no. WO 2019/178589 A1 on 19 Sep. 2019. This application claims the benefit of U.S. provisional application No. 62/644,198, filed 16 Mar. 2018 (the '198 application). This application claims the benefit of U.S. provisional application No. 62/693,749, filed 3 Jul. 2018 (the '749 application). The '704 application, '198 application and the '749 application are all hereby incorporated by reference in their entirety as though fully set forth herein.

FIELD OF THE INVENTION

Embodiments of the present disclosure relate generally to a method, apparatus and system for the optimization of the cleaning and treatment of dirty water.

BACKGROUND

Cleaning up contaminated water from any source is becoming a bigger issue as the world attempts to evolve to a Zero Liquid Discharge (ZLD) philosophy. Many industries are challenged by the economics of ZLD. The Hydraulic Fracturing hydrocarbon recovery process has proven to be an effective way of recovering fossil energy. However, it is not without negative issues, especially related to contaminated water disposal. One of the undesirable traits of the process is its need for large quantities of water in the beginning of the process. A typical well will require many millions of gallons of water in the beginning or injection part of a fracing process. There is a larger disposal requirement to dispense with fossil water or salt laden brine water which is returned during the balance of the hydrocarbon recovery process. This fossil water is known as "produced water" and contains large amounts of salts. In some cases, the amount of salt contained in the produced water can be over 200,000 ppm of salts. To date, the most prevalent practice for produced water disposal is deep well injection. The produced water is effectively pumped deep into the ground. Unfortunately, it appears this process has precipitated seismic events or earth quakes in a number of locations. Deep well injection can also be very costly in some locations.

BRIEF SUMMARY

Embodiments of the present disclosure include a system for optimizing dirty water remediation and re-use. The system can include a first treatment system that includes a direct contact thermal distillation system or an evaporator. The system can further include a frac water re-use treatment system.

Embodiments of the present disclosure include a system for optimizing dirty water remediation and re-use. The system can include a first treatment system that includes a direct contact thermal distillation system or an evaporator. The system can further include a reverse osmosis water treatment system.

Embodiments of the present disclosure include a system for optimizing dirty water remediation and re-use. The system can include a first treatment system that includes a direct contact thermal distillation system or an evaporator. The system can further include a frac water re-use treatment system. The system can further include a reverse osmosis water treatment system.

Embodiments of the present disclosure include a system for optimizing dirty water remediation and re-use. The system can include a first treatment system that includes a direct contact thermal distillation system or an evaporator. The system can further include a frac water re-use treatment system. The system can further include a reverse osmosis water treatment system. The system can further include a condenser for the direct contact thermal distillation system.

DETAILED DESCRIPTION

Embodiments of the present disclosure relate generally to a method, apparatus and system for the optimization of dirty water cleaning and processing treatment. The system, apparatus and method can be used in the enhanced oil recovery industry in processes such as Hydraulic Fracturing, or any other application which requires large quantities of contaminated water to be treated. An effective method of produced and contaminated water disposal is taught in PCTUS2018/018614, titled Dirty Water Distillation and Salt Harvesting System, Method, and Apparatus, which is incorporated by reference as through fully set forth herein. Embodiments of the present disclosure can utilize an evaporation process and other treatments, such as a simple "Treater" to re-process produced or flowback water and other treatments such as a Reverse Osmosis System. One evaporation process could be a direct contact steam generator known in the industry as a Direct Contact Thermal Distillation™ or DCTD™ system. In some cases, the evaporation process, such as DCTD™ technology can be combined with other technologies, such as Reverse Osmosis (RO), when the Total Dissolved Solids (TDS) and other contaminants are compatible. Produced waters from basins such as the Anadarko and Niobrara can fit this compatibility constraint. Ideally, an optimized method of implementing the evaporator process, such as the use of submerged combustion, crystallizers, forced heated air evaporators, compression evaporators, multiple effect distillation, evaporation ponds, or a DCTD™ system and best in class water treatment is needed to reduce the cost of contaminated water processing. It is also preferred that all byproducts serve a beneficial use (ZLD) and no byproducts are injected into a disposal well. These advantageous goals are achieved and taught in this disclosure.

Various embodiments of the present disclosure include a system for optimizing a distillation or evaporator system such as a system described in PCTUS2018/018614 (e.g., a DCTD™ system), titled Dirty Water Distillation and Salt Harvesting System, Method, and Apparatus, which is incorporated by reference as through fully set forth herein, or other evaporators (e.g., evaporator process, such as the use of submerged combustion, crystallizers, forced heated air evaporators, compression evaporators, multiple effect distillation, evaporation ponds) and other water treatment systems such as RO, frothing, or conventional chemical conversion and filtration systems in series or parallel. The RO and chemical conversion and filtering processes may be further optimized by increasing the temperature of the contaminated water before it communicates with the treatment systems. The increase in feedwater temperature may be induced by a DCTD™ system or any other heat source set up to heat water and produce a minimum amount of steam.

Figure 1:
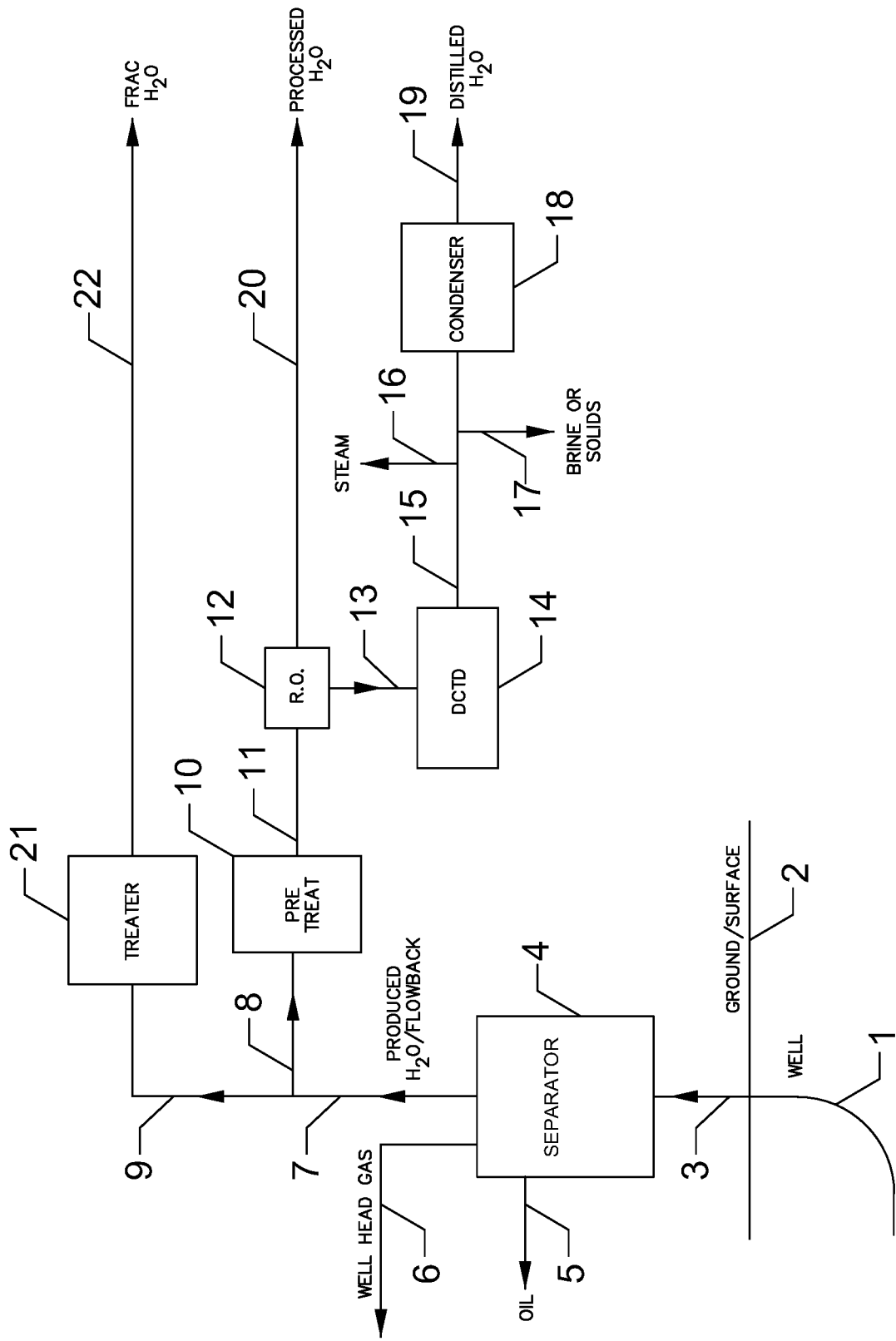
FIG. 1 depicts a simplified schematic representation of an optimized dirty water cleaning and processing treatment system, in accordance with embodiments of the present disclosure.

FIG. 1 depicts a simplified schematic example of an optimized fracing or hydrocarbon recovery dirty water cleaning and processing treatment system, in accordance with embodiments of the present disclosure. In FIG. 1, a horizontal well 1, which is drilled subsurface, transmits through the ground surface 2 a hydrocarbon laden fluid in fluid conduit 3. The fluid in fluid conduit 3 can be processed through a separator 4 where the well head gas can be separated and transferred out of the separator 4 via well head gas conduit 6; oil can be separated and transferred out of the separator 4 via oil conduit 5; and produced water can be coarsely separated and transferred out of the separator 4 via produced water conduit 7. In the original frac or refrac process, the fluid in water conduit 7 can be flowback fracing fluid for some period of time. For example, following hydraulic fracturing of a well, fluids used in the fracing process can be returned to the surface of the well, which can be referred to as flowback fracing fluid. After the flowback period, fossilized water can be returned to the surface of the well and can pass through the separator 4 and out of the water conduit 7. The fossilized water passing out of the separator 4 through the water conduit 7 can be referred to herein as produced water. In some embodiments, this produced water (e.g., fossilized water) can be fed, via produced water conduit 9, through a frac water re-use treatment system. As depicted in FIG. 1, the frac water re-use treatment system can include a treater 21, which in some embodiments can be a minimal filter to an advanced filter and/or chemical treatment process. Upon passing through the filter, the resultant fluid can be a salt laden fluid, which can pass through conduit 22. The resultant salt laden fluid in conduit 22 can be re-used by the producer with the recombining of additives such as "Slick Water" to then be re-used in a frac or re-frac operation. Fortunately, this minimally processed fluid in conduit 22 has a beneficial use and an economic value (e.g., for frac and/or re-frac operations). The process fits with the philosophy of ZLD.

Unfortunately, at some point in the operation of the basin, there can be an overabundance of fossilized produced water. For example, there can be simply too much produced water to be re-processed and used in fracing operations. Today, the excess water is typically disposed of in Salt Water Disposal Wells by deep water injection.

In basins such as the Anadarko and Niobrara where the TDS typically ranges from 10,000 ppm to 30,000 ppm, a much more optimized method of water treatment and reclamation can be used. The excess salt laden fossilized water in conduit 7 can be directed to a pre-treatment process 10 via a pre-treatment feed conduit 8. One of the goals of pre-treatment process 10 can be to condition the produced water to a state that will not harm the reverse osmosis (RO) membranes depicted in FIG. 1. For example, the produced water can flow through the pre-treatment process 10 and out of the pre-treatment process 10 via the pre-treatment outlet conduit 11 and into a reverse osmosis membrane treatment stage 12. Pre-treaters can be included in the pre-treatment process 10, which can neutralize or separate the oils or hydrocarbons in the fluid in pre-treatment feed conduit 8 and kill any organic life or "bugs". A novel new treatment process is taught in FIG. 2 and can be substituted or augmented for the pre-treatment system just described.

Figure 2:
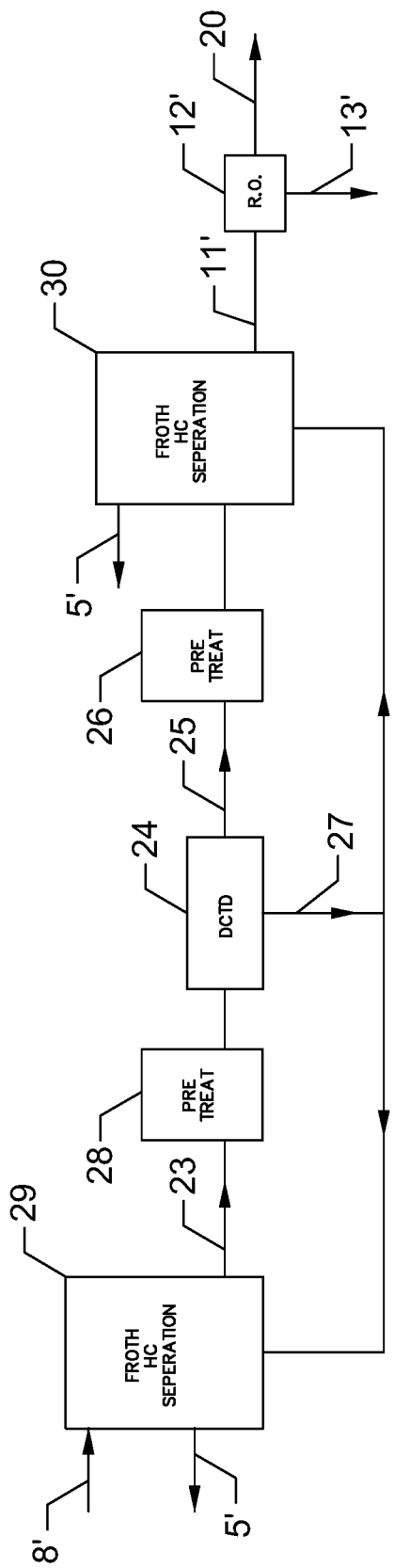
FIG. 2 depicts a detailed schematic of a water pre-treatment system, in accordance with embodiments of the present disclosure.

FIG. 2 depicts a detailed schematic of a water pre-treatment system, in accordance with embodiments of the present disclosure. Components depicted in FIG. 2 that are the same or similar to those depicted in FIG. 1 are denoted with a "prime" symbol. For example, the pre-treatment feed conduit 8, depicted in FIG. 1 can be depicted as pre-treatment feed conduit 8', in FIG. 2. In FIG. 2, produced water from conduit 8' enters a Froth Hydrocarbon Separation system 29. The frothing process is driven from the excess compressed air generated in the DCTDTM system 24 and communicated through air conduit 27. In an example, the compressed air can be generated by a compressor, as disclosed in PCTUS2018/018614, titled Dirty Water Distillation and Salt Harvesting System, Method, and Apparatus, which is incorporated by reference as through fully set forth herein. In some embodiments, oil can be separated from the produced water entering pre-treatment water conduit 8' (e.g., produced water conduit) and can be output via an oil conduit 5' and can be sold. The separated produced water in conduit 23 could be optionally further treated by a chemical and/or filter process shown as pre-treatment 28. To further gas off any remaining hydrocarbons and kill any "Bugs" the fluid can enter the DCTD™ system 24, which can be configured to operate as a water heater. In some embodiments, the DCTD™ system 24 can bring the fluid up to a temperature just below boiling. Those skilled in the art will recognize the DCTD™ system in this mode of operation only requires a small amount of sensible heat and no latent heat. This is a very efficient operating condition for a DCTD™ system. In some embodiments, the function of the DCTD™ system 24 can eliminate the need for an expensive conventional pre or post treatment system. The expendable chemicals in these conventional treatments are expensive and difficult to select and maintain correctly.

A second pre-treatment 26 can receive fluid from the DCTD™ system 24 via conduit 25 and can be similar to or the same as the pre-treatment 28 and a second Froth Hydrocarbon Separation system 30 can be similar to or the same as the Froth Hydrocarbon Separation system 29. They may be optionally used in series and/or can be substituted for the Froth Hydrocarbon Separation system 29 and pre-treatment 28 located upstream of the DCTD™ system 24. The location of the second pre-treatment 26 and the second Froth Hydrocarbon Separation system 30 can provide for an augmented efficiency due to a temperature of the fluids flowing through the second pre-treatment 26 and the second Froth Hydrocarbon Separation system 30 being elevated as a result of the DCTD™ system 24. In an example, with reference to the embodiments disclosed in FIG. 2, the RO system 12' can operate at an enhanced efficiency as a result of the elevated temperature of the feedstock being provided to the RO system 12' via pre-treatment outlet conduit 11'. In some embodiments, the feedstock provided to the RO system 12' can go through one or more pre-treatment processes, which can include at least one of a filter and a chemical treatment.

With further reference to FIG. 1, whether pre-treatment system 10 is a conventional system or an advanced system, as described by FIG. 2, feedstock fluid in pre-treatment outlet conduit 11 can be provided to the RO system 12. The output from the RO system 12 can be clean processed water, which can flow through processed water conduit 20 and can be used as a valuable potable or non-potable water resource staying in keeping with the philosophy of ZLD.

Water that is rejected by the RO system 12 can be fed through conduit 13. The water fed through conduit 13 can typically have a TDS level in excess of 100,000 PPM and the conduit through which it is fed can be in communication with an evaporator, such as the DCTD™ system 14. The operation of the DCTD™ system is described in PCTUS2018/018614, titled Dirty Water Distillation and Salt Harvesting System, Method, and Apparatus, which is incorporated by reference as through fully set forth herein. Steam and blowdown brine or solids can be transmitted through conduit 15. Steam can be evaporated in steam conduit 16 and/or reclaimed through condenser 18 and transferred in conduit 19 to be used as a valuable potable or non-potable distilled water product. This again is in keeping with the philosophy of ZLD.

A valuable brine solution such as a 10 lb brine or a salt solids product can be extracted from conduit 17. Both commodities have industrial value and are in keeping with the philosophy of ZLD.

Embodiments are described herein of various apparatuses, systems, and/or methods. Numerous specific details are set forth to provide a thorough understanding of the overall structure, function, manufacture, and use of the embodiments as described in the specification and illustrated in the accompanying drawings. It will be understood by those skilled in the art, however, that the embodiments may be practiced without such specific details. In other instances, well-known operations, components, and elements have not been described in detail so as not to obscure the embodiments described in the specification. Those of ordinary skill in the art will understand that the embodiments described and illustrated herein are non-limiting examples, and thus it can be appreciated that the specific structural and functional details disclosed herein may be representative and do not necessarily limit the scope of the embodiments, the scope of which is defined solely by the appended claims.

Reference throughout the specification to "various embodiments," "some embodiments," "one embodiment," or "an embodiment", or the like, means that a particular feature, structure, or characteristic described in connection with the embodiment(s) is included in at least one embodiment. Thus, appearances of the phrases "in various embodiments," "in some embodiments," "in one embodiment," or "in an embodiment," or the like, in places throughout the specification, are not necessarily all referring to the same embodiment. Furthermore, the particular features, structures, or characteristics may be combined in any suitable manner in one or more embodiments. Thus, the particular features, structures, or characteristics illustrated or described in connection with one embodiment may be combined, in whole or in part, with the features, structures, or characteristics of one or more other embodiments without limitation given that such combination is not illogical or non-functional.

Although at least one embodiment for a dirty water treatment optimization has been described above with a certain degree of particularity, those skilled in the art could make numerous alterations to the disclosed embodiments without departing from the spirit or scope of this disclosure. All directional references (e.g., upper, lower, upward, downward, left, right, leftward, rightward, top, bottom, above, below, vertical, horizontal, clockwise, and counterclockwise) are only used for identification purposes to aid the reader's understanding of the present disclosure, and do not create limitations, particularly as to the position, orientation, or use of the devices. Joinder references (e.g., affixed, attached, coupled, connected, and the like) are to be construed broadly and can include intermediate members between a connection of elements and relative movement between elements. As such, joinder references do not necessarily infer that two elements are directly connected and in fixed relationship to each other. It is intended that all matter contained in the above description or shown in the accompanying drawings shall be interpreted as illustrative only and not limiting. Changes in detail or structure can be made without departing from the spirit of the disclosure as defined in the appended claims.

Any patent, publication, or other disclosure material, in whole or in part, that is said to be incorporated by reference herein is incorporated herein only to the extent that the incorporated materials does not conflict with existing definitions, statements, or other disclosure material set forth in this disclosure. As such, and to the extent necessary, the disclosure as explicitly set forth herein supersedes any conflicting material incorporated herein by reference. Any material, or portion thereof, that is said to be incorporated by reference herein, but which conflicts with existing definitions, statements, or other disclosure material set forth herein will only be incorporated to the extent that no conflict arises between that incorporated material and the existing disclosure material.

The invention claimed is:

1. A system for optimizing dirty water remediation and re-use, comprising:
    a first treatment system that includes a direct contact thermal distillation system, wherein the first water treatment system is fed water from a produced water conduit and is operative to heat the water, to gas off hydrocarbons included in the water and to bring a temperature of the water from the produced water conduit to just below boiling; and
    a frac water re-use treatment system including a treatment unit selected from the group consisting of a filter, a chemical treatment unit to chemically treat water fed from the produced water conduit and combinations thereof, wherein the frac water re-use treatment system is fed water from the produced water conduit.

2. A system for optimizing dirty water remediation and re-use, comprising:
    a first treatment system that includes:
    a direct contact thermal distillation system, wherein the direct contact thermal distillation system is fed water from a produced water conduit and is operative to heat the water, to kill off organic life included in the water and to bring a temperature of the water from the produced water conduit to just below boiling; and
    a reverse osmosis water treatment system fluidly coupled downstream with respect to the direct contact thermal distillation system.

3. The system of claim 2, wherein the system further includes a frac water re-use treatment system, and wherein the frac water re-use treatment system includes a filter.

4. A system for optimizing dirty water remediation and re-use, comprising:
    a first treatment system that includes a direct contact thermal distillation system, wherein the first water treatment system is fed water from a produced water conduit and is operative to heat the water, to gas off hydrocarbons included in the water and to bring a temperature of the water from the produced water conduit below boiling;
    a frac water re-use treatment system including a treatment unit selected from the group consisting of a filter, a chemical treatment unit to chemically treat water fed from the produced water conduit and combinations thereof, wherein the frac water re-use treatment system is fed water from the produced water conduit; and a reverse osmosis water treatment system fluidly coupled downstream with respect to the direct contact thermal distillation system.

5. A system for optimizing dirty water remediation and re-use, comprising:

a first treatment system that includes a direct contact thermal distillation system, wherein the first water treatment system is fed water from a produced water conduit and is operative to heat the water, to gas off hydrocarbons included in the water and to bring a temperature of the water from the produced water conduit to just below boiling;

a frac water re-use treatment system including a treatment unit selected from the group consisting of a filter, a chemical treatment unit to chemically treat water fed from the produced water conduit and combinations thereof, wherein the frac water re-use treatment system is fed water from the produced water conduit;

a reverse osmosis water treatment system fluidly coupled upstream with respect to the direct contact thermal distillation system;

and a condenser for the direct contact thermal distillation fluidly coupled downstream with respect to the direct contact thermal distillation system.

6. The system as in any one of claims 2-5, wherein a feedstock provided to the reverse osmosis system is first fed through a pre-treatment system, disposed upstream of the reverse osmosis water treatment system.

7. The system as in any one of claims 2-5, wherein a feedstock provided to the reverse osmosis system is first fed through a pre-treatment system, disposed upstream of the reverse osmosis water treatment system, wherein the pre-treatment system includes a hot water heater.

8. The system as in any one of claims 2-5, wherein a feedstock provided to the reverse osmosis system is first fed through a pre-treatment system, disposed upstream of the reverse osmosis water treatment system, wherein the pre-treatment system includes a hot water heater which is included in a second direct contact thermal distillation system.

9. The system as in any one of claims 2-5, further comprising a pre-treatment system, wherein the pre-treatment system includes a frothing system, which receives compressed air from the direct contact thermal distillation system.

* * * * *